United States Patent [19]

Furukawa

[11] 4,168,904

[45] Sep. 25, 1979

[54] PHOTOGRAPHIC COLOR ENLARGER

[75] Inventor: Hiroshi Furukawa, Kashiwara, Japan

[73] Assignee: Minolta Camera Kabushiki Kaisha, Osaka, Japan

[21] Appl. No.: 871,277

[22] Filed: Jan. 23, 1978

[30] Foreign Application Priority Data

Jan. 26, 1977 [JP] Japan ................................ 528776[U]

[51] Int. Cl.² .............................................. G03B 27/76
[52] U.S. Cl. ................................................... 355/71
[58] Field of Search ..................... 355/32, 35, 37, 38, 355/77, 67–71

[56] References Cited

U.S. PATENT DOCUMENTS

| | | | |
|---|---|---|---|
| 3,002,425 | 10/1961 | Biedermann et al. | 355/38 X |
| 3,083,614 | 4/1963 | Veit | 355/38 |
| 3,754,824 | 8/1973 | Weisglass et al. | 355/35 |
| 3,800,070 | 3/1974 | Barbieri | 355/35 X |
| 3,880,519 | 4/1975 | Barbieri | 355/77 X |

*Primary Examiner*—Donald A. Griffin
*Attorney, Agent, or Firm*—Wolder, Gross & Yavner

[57] ABSTRACT

One or more color-compensating filter-adjusting dials in the head portion of a color enlarger have on their peripheral surfaces indicia denoting values which are a function of the extent a corresponding color-compensating filter intercepts an optical path, and have in their end surfaces cams for directly or indirectly operating respective color-compensating filters. The dials are disposed in the head portion above a reflector in a mixing chamber in the head portion in a manner to be freely externally accessible and manually operable and with the indicia on the dials being visible externally of the head portion.

13 Claims, 5 Drawing Figures

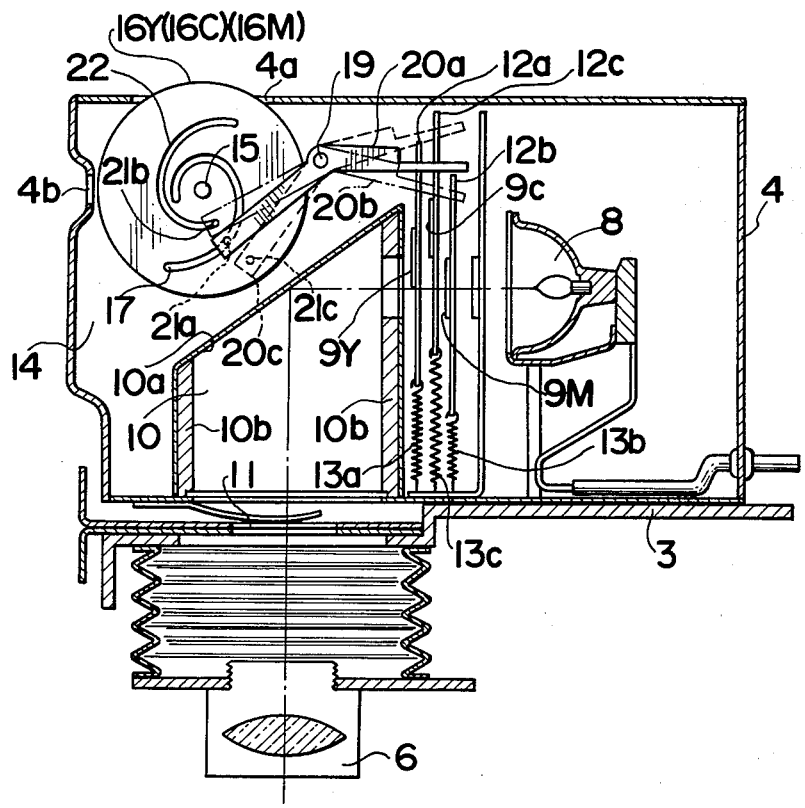
FIG.3
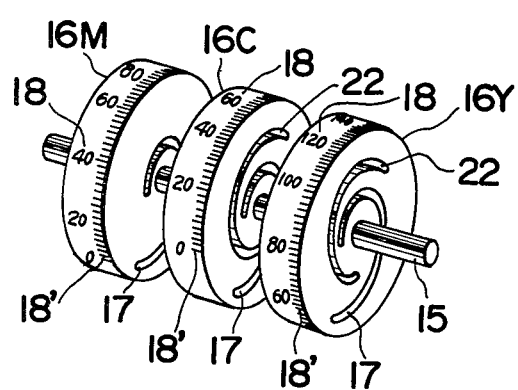
FIG.4
FIG.5

PHOTOGRAPHIC COLOR ENLARGER

BACKGROUND OF THE INVENTION

The present invention relates to improvements in photographic color enlargers, and more particularly to an improved photographic color enlarger of the color mixing type in which the color balance is adjusted by varying the extent to which a color-compensating filter enters the light optical path and the compensation for color balance (subtractive color type) is achieved by the use of a plurality of dichroic filters.

In an earlier form of color enlarger, a filter operating mechanism has been disposed sideways of a mixing box, with a resultant increase in the overall size of the enlarger itself. Furthermore, in such a color enlarger, cams for shifting the color-compensating filters into the light optical path to the proper extent, commensurate with an indicated filter number, dials for operating the cams, and filter-number indicating portions have been provided separately from one another, thus resulting in an excessively large number of parts for the filter-operating mechanism, and a high complexity in the construction of the mechanism. This necessarily entails an increased manufacturing cost as well as a decrease in reliability and accuracy.

SUMMARY OF THE INVENTION

It is a principal object of the present invention to provide an improved mixing type, photographic color enlarger, and more particularly a compact color enlarger of the above type, wherein dead space is minimized and the space above the mixing chamber is effectively utilized, so as to reduce the size and bulk of the enlarger.

It is another object of the present invention to provide an improved mixing type photographic color enlarger in which the number and kind of parts are reduced and which is rugged and simple in construction and is less expensive to manufacture and is of easy and reliable operation.

In a sense the present invention contemplates the provision of an improved compact photographic color enlarger comprising a casing having front and rear sections and including top and front end walls, a light mixing box located in the casing front section and including a rear wall with an inlet part and a bottom outlet opening and a rearwardly upwardly inclined top wall delineating with the casing top and front end walls a housing space, a light source located in the casing rear section and directing a light beam through the box inlet part onto the box top wall inside face, at least one color filter movable along a path across the light beam and means for adjusting the position of the color filter including a movable operating member located in the housing space and manually and visually accessible externally of the casing, and coupling means interconnecting the operating member and color filter whereby manual movement of the operating member effects the movement of the color filter to control the extent of the interception thereby of the light beam.

Another feature of the present invention resides in the filter-adjusting or operating mechanism in which the operating member includes a wheel having a cam formed in an end face thereof and which comprises a follower engaging the cam and coupled to the color filter. Advantageously, the wheel carries indicia on its peripheral face which are externally visible and indicates the extent of beam interception by the controlled light filter and the cam engaging follower is coupled to the light filter by a swingable lever one end of which carries the follower and the other end of which is connected to the light filter which is spring biased to a beam intercepting position.

The improved color enlarger is compact, rugged and simple with a minimum of dead space and is reliable and easy and convenient to operate and service.

BRIEF DESCRIPTION OF THE DRAWINGS

FIG. 3 is a diagrammatic longitudinal sectional view of the internal construction of the part of the device shown in FIG. 2;

FIG. 4 is a perspective view of a dial assembly forming part of the enlarger device; and FIG. 5 is a perspective view of a modified dial member.

DETAILED DESCRIPTION OF THE PREFERRED EMBODIMENTS

Figure 1:
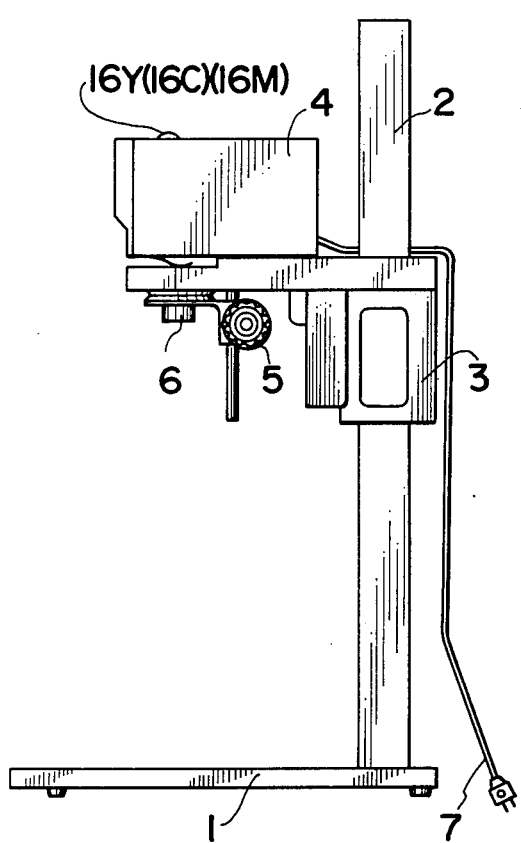
FIG. 1 is a side elevational view of an improved enlarger device embodying the present invention.

Referring now to FIG. 1 of the drawings which illustrates a preferred embodiment of the present invention, the reference numeral 3 generally designates a support portion which is adjustably vertically slidably supported by a post 2 mounted upright on a support 1. A color head portion 4 is located on support portion 3, to the underface of which is secured a bellows connected enlarging lens 6 so arranged as to be focused by a focusing dial 5 in the known manner.

As clearly shown in FIG. 3, color head portion 4 includes a housing or casing which houses therein a light source 8 to which current is fed by way of an electrical cable and power source plug 7 (FIG. 1); dichroic filters 9Y, 9M and 9C, respectively, for yellow, magenta and cyan; and a reflection type mixing box 10 including an inclined reflector wall 10a by which a horizontal beam entering the box 10 through an opening therein from light source 8 is reflected and dispersed downwardly in a direction perpendicular to the beam and light-dispersing, mixing walls 10b having a fine, rough surface so as to mix the beams reflected by the reflector. The horizontal beam traversing a dichroic filter selected from the dichroic filters 9Y, 9M and 9C from light source 8 is redirected by reflector 10a in a perpendicular direction, then passes through a negative film (not shown) retained on a negative film carrier 11 inserted between the bottom portion of color head portion 4 and support portion 3, and eventually traverses enlarging lens 6. The enlarging lens 6 is focused by manipulating the focusing dial 5, so that the image of the negative film is sharply focused on a printing sheet (not shown) placed on the support 1. A change in the enlargement magnification ratio is achieved by sliding the support portion 3 vertically along post 2 so as to shift color head portion 4 and enlarging lens 6 to desired positions.

The dichroic filters 9Y, 9M and 9C are carried by vertical slide members 12a, 12b and 12c, respectively, disposed within color head portion 4, and biased downwardly by helical tension springs 13a, 13b and 13c connected between the casing base and respective slide members.

Figure 2:
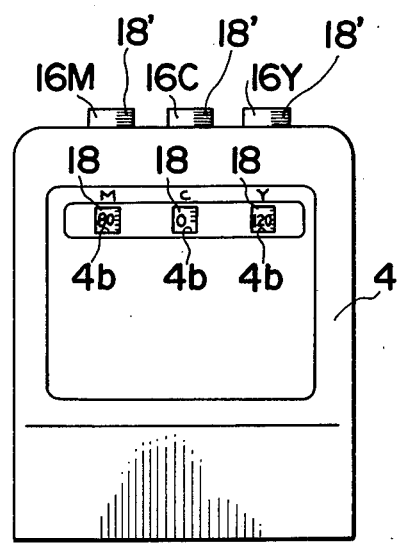
FIG. 2 is a front elevational view of an essential part of the device of FIG. 1.

Within a space 14 which is left between the top wall of the roughly rectangular color head portion 4 and the reflector 10a having a slope of 45° and forming the top portion or wall of the mixing box 10, three filter-operating wheels or dials 16Y, 16M and 16C are rotatably supported by a shaft 15, which in turn is attached or journalled to the walls of color head portion casing. The dials 16Y, 16M and 16C each have a filter operating cam groove 17 in one end surface thereof, and filter-number indication marks 18 and graduations 18' on the peripheral surface thereof. The color head portion casing 4 has openings 4a in the top wall thereof, through which the upper parts of the peripheral surfaces of respective dials 16Y, 16M and 16C serving as operating portions are exposed and accessible. The color head portion casing has windows 4b in the front wall thereof, through which an operator can see the filter-number indicating marks 18 and graduations 18' provided on the peripheral surfaces of respective dials 16Y, 16M and 16C, as shown in FIG. 2.

The filter-operating dials 16Y, 16M and 16C are rotatably mounted in side-by-side relation on shaft 15 extending transversely of the color head portion as viewed from the front portion thereof, and the arrangement of the dials is best seen in FIG. 4. Respective dials 16Y, 16M and 16C are releasably retained in desired positions by any suitable friction mechanism or click stop mechanism (not shown). Openings 4a for dial operation and windows 4b for observing filter-number indicating marks and graduations may be replaced by only one opening. In such case, indicia with which the marks and graduations of respective dials are to match need be provided on the peripheral wall of the opening.

There are provided three operating levers 20a, 20b and 20c which are swingably supported by a shaft 19 and have on respective one arm thereof pins 21a, 21b and 21c which define followers and which engage one of the cam grooves in respective dials 16Y, 16M and 16C so that the respective levers effect a pivotal movement when corresponding dials are turned. The other arm ends of operating levers 20a, 20b and 20c are connected or coupled by any suitable means to respective slide members 12a, 12b and 12c which support corresponding filters 9Y, 9M and 9C. Another filter-operating cam groove 22 is provided in one end surface of respective dial wheel. The provision of a plurality of cam grooves corresponding in number to the number of filters in the side-surface of a single dial wheel allows a plurality of filters to be operated by only a single dial wheel, resulting in reduction in number of dial wheels. This eliminates a need to provide a plurality of wheels of the number equal to the number of filters, thus greatly curtailing the manufacturing cost as well as the cost for maintenance, when compared with the case where plural dial wheels each having only a single cam groove are used so as to operate respective filters. The number of cam grooves need not only be two, but three cam grooves 17, 22 and 23 corresponding to three respective filters may be provided in one dial wheel as shown in FIG. 5, so that plural color compensating filters may be operated by a single dial wheel having three cam grooves. Although in the above embodiment two cam grooves are provided separately from each other in one dial wheel, a continuous cam groove run may achieve the same function as the above two cam grooves, if part of the run of the continuous cam groove is used for operating one filter and the rest of cam groove is used for operating the other filter.

In enlarging a color picture, when the filter shifting dials 16Y, 16M and 16C are rotated, respective levers 20a, 20b and 20c associated with these dials by the engagement of cam grooves 17, 22 and 23 with pins 21a, 21b and 21c are swung to cause dichroic filters 9Y, 9M and 9C to enter, the optical path of the light beam from light source 8 to a given extent. By turning the respective dials, the filter-number indicating marks provided on the peripheral surfaces of respective dial wheels appear in the front windows 4b in color head portion 4, which denote the extent to which the filters enter the optical path.

According to the present invention, since a cam for introducing a color compensating filter into the optical path of the beam from light source 8 and the indication marks for denoting the corresponding filter number are integrally provided on the filter-shifting dial, there results a reduction in the number of parts in the filter-operating mechanism as well as a simplicity in the construction of the mechanism. These dials and color-compensating filter-operating levers associated therewith are placed in the space left between the top wall of the color head portion and the top portion of the mixing chamber so that the size of the color head portion of the color enlarger may be greatly reduced as may the enlarger itself. According to the present invention, in addition to a cam groove provided in a single dial wheel for operating a specific filter, one or more cam grooves for operating one or more filters may be provided on the same dial, so that this dial may be used alone for operating two or all of filters. In the manufacture of the dial, therefore, a mold of a single type is only necessary, while dispensing with the maintenance of a dial according to the type, thus leading to a reduction in the manufacturing cost of a dial, as compared with the case where three dials each having a single cam groove for operating a specific filter are incorporated for operating respective filters. These arrangements contribute to a reduction in the operating cost of the color enlarger, coupled with a simplicity in the construction of the filter operating mechanism. The use of plastic as a material for the dial increases the ease of manufacture to a great extent.

What is claimed is:

1. In a color enlarger having a housing which is substantially of a rectangular configuration and movable in a vertical direction, a combination in said housing comprising:
    light source means for emitting a beam in a direction normal to the direction of movement of said housing;
    color filter means insertable into said beam so as to partly color said beam;
    chamber means for mixing the colored and uncolored portions of said beam, and having a reflector inclined to an axis of said beam for reflecting said beam in a direction towards the bottom of said housing;
    rotatable wheel means provided above said reflector and partly exposed through the housing for manual operation; and
    control means for moving said filter means in accordance with the manual operation of said wheel means.

2. A color enlarger as set forth in claim 1, wherein said wheel means further includes an indicating scale indicative of the amount of insertion of said filter means into said beam, and said housing includes a window portion providing visual access to said scale from outside the housing.

3. A color enlarger as set forth in claim 2, wherein said indicating scale is provided on the peripheral surface of said wheel means, said wheel means is partly exposed at the upper surface of said housing, and said window portion is provided in the side wall of said housing.

4. A color enlarger as set forth in claim 3, wherein said wheel means further includes cam means located on its side surface, and said control means includes an operating lever pivotably mounted between said wheel means and said color filter means and having one end coupled to said filter means and the other end engaged with said cam means whereby said filter means is operated in accordance with the rotation of said wheel means.

5. In a color enlarger including a light source means for forming a beam, a plurality of color filters insertable into said beam so as to partly color said beam, chamber means for mixing the colored and uncolored portions of said beam and for directing the mixed beam in a predetermined direction, and operating means for moving said color filters, said operating means comprising:
manually movable operating members corresponding in number to that of said color filters;
cam means located on said operating members as integral parts thereof; and
interconnecting means for interconnecting said color filters and said cam means for moving said color filters by the movement of said operating members.

6. A color enlarger comprising a casing having a front and rear sections and including top and front end walls, a light mixing box located in said casing front section and including a rear wall with an inlet opening, a bottom outlet opening and a rearwardly upwardly inclined top wall delineating with said casing top and front end walls a housing space, a light source located in said casing rear section and directing a beam of light through said mixing box inlet opening onto the inside face of said mixing box inclined top wall at least one color filter movable along a path across said beam of light between said mixing box and light source between a retracted position and positions partly intercepting said light beam and means for adjusting the position of said color filter including a movable operating member located in said housing space and manually and visually accessible externally of said casing and coupling means interconnecting said color filter and operating member whereby manual movement of said operating member effects the movement of said color filter to control the extent of interception thereby of said light beam.

7. The color enlarger of claim 6, wherein said operating member comprises a wheel rotatably supported in said housing space and having a cam located on an end face thereof and said coupling means comprises a lever swingably supported between said wheel and said color filter and having a follower at one end engaging said cam and coupled at its other end to said color filter.

8. The color enlarger of claim 7, wherein said wheel carries indicia on the peripheral face thereof, said indicia being externally exposed.

9. A color enlarger comprising a casing, a light mixing box located in said casing and having light inlet and outlet openings, a light source located in said casing and directing a beam of light into said mixing box through said inlet opening, at least one color filter movable along a path across said beam of light between said mixing bowl and light source between a retracted position and positions intercepting said light beam, an operating wheel rotatably supported in said casing and manually accessible externally of said casing and having a cam formed in its end face, a follower engaging said cam and means coupling said follower to said color filter whereby rotation of said wheel moves said color filter along said path to control the extent of interception of said light beam by said color filter.

10. In a color enlarger including a light source means for forming a beam, a plurality of color filters insertable into said beam so as to partly color said beam and including a cyan colored filter, a magenta colored filter and a yellow colored filter, chamber means for mixing the colored and uncolored portions of said beam and for directing the mixed beam in a predetermined direction, and operating means for moving said color filters, said operating means comprising:
manually movable operating members including three wheels corresponding to said three color filters;
cam means located on said operating members and including three different cam portions operating respective color filters, at least two of said wheels being of the same shape and having at least two of said cam portions; and
interconnecting means for interconnecting said color filters and said cam means for moving said color filters by the movement of said operating members.

11. A color enlarger as set forth in claim 10, wherein said cam portions consist of separate cam grooves.

12. A color enlarger as set forth in claim 11, wherein said three wheels are of the same shape.

13. A color enlarger as set forth in claim 12, wherein said wheels further include on their circumferential surfaces scales indicative of the amount of insertion of respective filters.

* * * * *